(12) United States Patent
Hofmann et al.

(10) Patent No.: US 10,058,851 B2
(45) Date of Patent: *Aug. 28, 2018

(54) USE OF MIXED OXIDES AS OXYGEN STORAGE COMPONENTS

(71) Applicant: UMICORE AG & CO. KG, Hanau-Wolfgang (DE)

(72) Inventors: Alexander Hofmann, Hanau (DE); Liesbet Jongen, Waechtersbach (DE); Daniel Herein, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/039,923

(22) PCT Filed: Nov. 25, 2014

(86) PCT No.: PCT/EP2014/075572
§ 371 (c)(1),
(2) Date: May 27, 2016

(87) PCT Pub. No.: WO2015/078875
PCT Pub. Date: Jun. 4, 2015

(65) Prior Publication Data
US 2017/0021340 A1   Jan. 26, 2017

(30) Foreign Application Priority Data

Nov. 29, 2013   (EP) ..................... 13195136

(51) Int. Cl.
*B01J 23/89*   (2006.01)
*B01D 53/94*   (2006.01)
(Continued)

(52) U.S. Cl.
CPC .......... *B01J 23/898* (2013.01); *B01D 53/945* (2013.01); *B01J 21/04* (2013.01); *B01J 23/6484* (2013.01);
(Continued)

(58) Field of Classification Search
CPC ... B01J 23/20; B01J 23/22; B01J 23/28; B01J 23/30; B01J 23/34; B01J 23/38;
(Continued)

(56) References Cited

U.S. PATENT DOCUMENTS 4,711,870 A   12/1987   Yamada et al.
5,045,521 A *   9/1991   Lox ................... B01D 53/945
                                              423/213.5
(Continued)

FOREIGN PATENT DOCUMENTS

EP   0714692 A1   6/1996
EP   2216087 A1   8/2010
(Continued)

OTHER PUBLICATIONS

Bergner, et al. VNb$_9$O$_{25}$-δ-Synethesis, electrical conducting behaviour and density functional theory (DFT) calculation. Journal of Solid State Chemistry, 182 (2009), 2053-2060.
(Continued)

*Primary Examiner* — Cam N. Nguyen
(74) *Attorney, Agent, or Firm* — Smith, Gambrell & Russell, LLP

(57) ABSTRACT

The present invention is concerned with the use of certain oxygen storage components. In particular, the use of special mixed oxides as oxygen storage components in exhaust catalysis is disclosed.

14 Claims, 1 Drawing Sheet

(51) Int. Cl.
*B01J 23/648* (2006.01)
*B01J 35/10* (2006.01)
*B01J 21/04* (2006.01)
*B01J 35/00* (2006.01)

(52) U.S. Cl.
CPC ....... *B01J 35/0006* (2013.01); *B01J 35/1014* (2013.01); *B01D 2255/1023* (2013.01); *B01D 2255/207* (2013.01); *B01D 2255/2065* (2013.01); *B01D 2255/2073* (2013.01); *B01D 2255/2092* (2013.01); *B01D 2255/20723* (2013.01); *B01D 2255/20738* (2013.01); *B01D 2255/20769* (2013.01); *B01D 2255/20776* (2013.01); *B01D 2255/40* (2013.01); *B01D 2255/908* (2013.01); *Y02T 10/22* (2013.01)

(58) Field of Classification Search
CPC ... B01J 23/40; B01J 23/42; B01J 23/44; B01J 23/48; B01J 23/50; B01J 23/52; B01J 23/6482; B01J 23/6484; B01J 23/6456; B01J 23/6525; B01J 23/6527; B01J 23/6562; B01J 23/682; B01J 23/685; B01J 23/686; B01J 23/687; B01J 23/688; B01J 23/745; B01J 23/8472; B01J 23/8474; B01J 23/8476; B01J 23/881; B01J 23/8877; B01J 23/888; B01J 23/8885; B01J 23/8892; B01J 23/8906; B01J 35/0006; B01J 35/1014; B01J 21/00; B01D 53/945
See application file for complete search history.

(56) References Cited

U.S. PATENT DOCUMENTS

| | | | | |
|---|---|---|---|---|
| 5,055,440 A * | 10/1991 | Chu | ................ | B01D 53/945 502/303 |
| 5,093,301 A * | 3/1992 | Chu | ................ | B01D 53/945 502/303 |
| 5,502,019 A * | 3/1996 | Augustine | ........ | B01D 53/8668 502/183 |
| 6,103,207 A * | 8/2000 | Chattha | ............ | B01D 53/945 423/213.2 |
| 6,172,000 B1 * | 1/2001 | Chattha | ............ | B01D 53/945 502/324 |
| 6,468,941 B1 | 10/2002 | Bortun et al. | | |
| 6,585,944 B1 | 7/2003 | Nunan et al. | | |
| 6,638,486 B2 * | 10/2003 | Masaki | ............ | B01D 53/8628 423/213.2 |
| 6,680,036 B1 * | 1/2004 | Fisher | .............. | B01D 53/945 423/213.2 |
| 6,855,661 B2 * | 2/2005 | Kim | ................. | B01D 53/945 502/216 |
| 6,861,387 B2 * | 3/2005 | Ruth | ................ | B01J 21/18 502/184 |
| 6,884,402 B2 * | 4/2005 | Masaki | ............ | B01D 53/8628 423/213.2 |
| 7,109,145 B2 * | 9/2006 | Ruth | ................ | B01J 21/18 429/483 |
| 7,166,263 B2 * | 1/2007 | Vanderspurt | ....... | B01J 23/002 423/263 |
| 7,202,194 B2 * | 4/2007 | Muhammed | ...... | B01D 53/945 502/304 |
| 7,329,627 B2 * | 2/2008 | Wanninger | ....... | B01D 53/864 502/304 |
| 7,612,011 B2 * | 11/2009 | Vanderspurt | ....... | B01J 23/002 502/302 |
| 7,825,065 B2 | 11/2010 | Ito et al. | | |
| 7,943,104 B2 | 5/2011 | Kozlov et al. | | |
| 7,968,492 B2 * | 6/2011 | Augustine | ........ | B01D 53/9418 423/239.1 |
| 8,530,372 B2 * | 9/2013 | Luo | ................. | B01D 53/945 502/303 |
| 8,673,809 B2 * | 3/2014 | Nakatsuji | .......... | B01D 53/945 502/302 |
| 8,959,894 B2 * | 2/2015 | Qi | ................... | B01D 53/9422 60/286 |
| 9,012,353 B2 * | 4/2015 | Golden | ............. | F01N 3/101 502/258 |
| 9,114,385 B2 * | 8/2015 | Brisley | ............ | B01D 53/9422 |
| 9,352,303 B2 * | 5/2016 | Chang | .............. | B01D 53/9418 |
| 9,573,097 B2 * | 2/2017 | Reichinger | ....... | B01D 53/9404 |
| 2005/0282698 A1 | 12/2005 | Southward et al. | | |
| 2010/0135879 A1 | 6/2010 | Roesch et al. | | |
| 2012/0040824 A1 | 2/2012 | Itou et al. | | |
| 2014/0018235 A1 | 1/2014 | Ito et al. | | |
| 2017/0014810 A1 | 1/2017 | Hofmann et al. | | |

FOREIGN PATENT DOCUMENTS

| | | |
|---|---|---|
| JP | 2005125317 A | 5/2005 |
| JP | 2006-239642 A | 9/2006 |
| JP | 2007-136339 A | 6/2007 |
| JP | 2007203160 A | 8/2007 |
| WO | 9723278 A1 | 7/1997 |
| WO | 9934904 A1 | 7/1999 |
| WO | 00/03790 A1 | 1/2000 |
| WO | 0240151 A1 | 5/2002 |
| WO | 2008113445 A1 | 9/2008 |
| WO | 2010/096612 A2 | 8/2010 |
| WO | 2011/109676 A2 | 9/2011 |
| WO | 2012133526 A1 | 10/2012 |

OTHER PUBLICATIONS

Börrnert, et al. Temperature-dependent oxygen release, intercalation behaviour and catalytic properties of $V_2O_5 \cdot xNb_2O_5$ compounds. Materials Research Bulletin, 46, (2011), 1955-1962.
Lewandowska, et al. In Situ TPR/TPO-Raman studies of dispersed and nano-scaled mixed V-Nb oxides on alumina. Catalysis Today, 118, (2006) 323-331.
Wilhelm Keim, Catalysis in Environmental Protection. Handbook of Heterogeneous Catalysis, 2nd Edition, (2008), 2265-2274.
Geus, et al. Preparation of Supported Catalysts by Deposition-Precipitation. (1999), 460-487.
International Preliminary Report on Patentability for PCT/EP2014/075572 dated May 31, 2016 (7 pages).
International Search Report for PCT/EP2014/075572, dated Feb. 19, 2015 in English Language.
Written Opinion of the International Searching Authority for PCT/EP2014/075572, dated Feb. 19, 2015 in English Language.
Christian-Hagelüken. Autoabgaskatalysatoren. Kontakt and Studium, 612, (2001), 48-51 & 74-79.
Heck, et al. Toward a Zero-Emission Stoichiometric Spark-Ignited Vehicle. Catalytic Air Pollution Control Commercial Technology. Wiley & Sons, Inc., Publication (2009), 148-157.
International Preliminary Report on Patentability for International Application No. PCT/EP2014/075552 dated May 31, 2016, 6 pages.
International Search Report for PCT/EP2014/075552, dated Feb. 19, 2015 in English Language.
Written Opinion of the International Searching Authority for PCT/EP2014/075552, dated Feb. 19, 2015 in English Language.
Office Action dated Jun. 4, 2018 in Japanese Patent Application No. 2016-535122 (4 pages in Japanese with English translation).
Office Action dated May 14, 2018 in Chinese Patent Application No. 201480064831 (7 pages in Chinese with English translation).

* cited by examiner

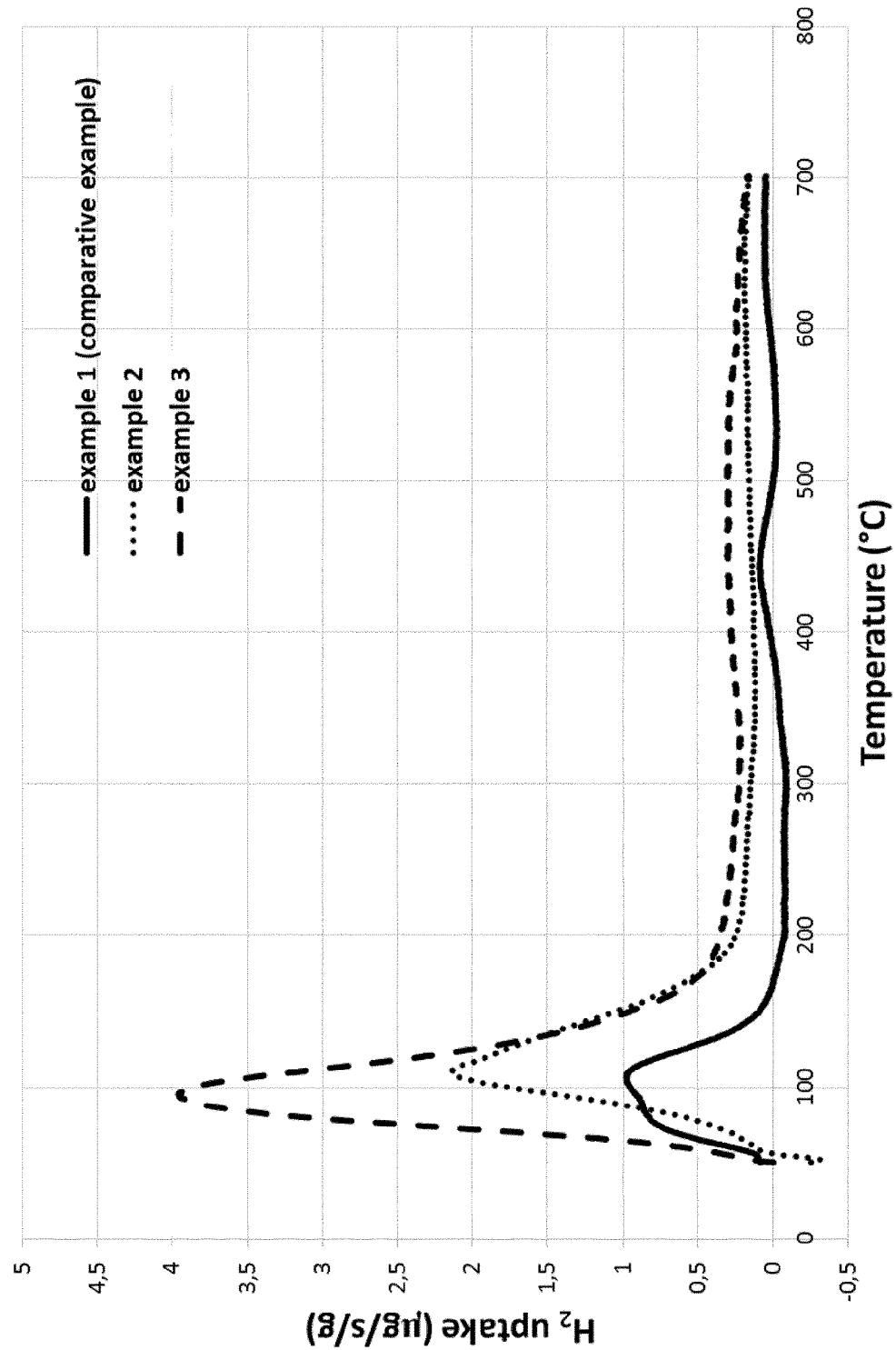

USE OF MIXED OXIDES AS OXYGEN STORAGE COMPONENTS

The present invention is concerned with oxygen storage components. In particular, the use of special oxygen storage components (OSC) as part of oxygen storage materials (OSM) in exhaust catalysis is proposed.

Exhaust gases from internal combustion engines operated with a predominantly stoichiometric air/fuel mixture, like e.g. port-fuel injection (PFI) or gasoline direct injected (GDI) engines with and without turbocharger, are cleaned according to conventional methods with the aid of three-way catalytic (TWC) converters. These are capable of converting the three essentially gaseous pollutants of the engine, specifically hydrocarbons (HC), carbon monoxide (CO), and nitrogen oxides (NOx), simultaneously to harmless components.

Optimal use of the TWC is around Lambda=1 where the air/fuel ratio is equal to 14.56 or simply $\lambda=1$. Above these values, the exhaust gas is said lean, and CO and HC are catalytically oxidized to carbon dioxide and water. Below this value, the exhaust gas is said rich and mainly NOx are reduced to nitrogen ($N_2$) using e.g. CO as reducing agent. However, the upcoming more stringent governmental emission regulations (e.g. EU-6—table 1, LEV-III) and fuel economy standards ($CO_2$ regulations) will of course make exhaust aftertreatment even more difficult in the future (table 1).

TABLE 1

Euro 6 emission limits for passenger cars

|  |  | compression ignition vehicles | spark ignition vehicles |
|---|---|---|---|
| THC | mg/km | n.a. | 100 |
| NMHC | mg/km | n.a. | 68 |
| HC + NOx | mg/km | 170 | n.a. |
| NOx | mg/km | 80 | 60 |
| CO | mg/km | 500 | 1000 |
| particle mass | mg/km | 4.5 | 4.5 |
| particle number | #/km | $6.0 \times 10^{11}$ | TBD |

Hence, also for gasoline vehicles, which predominantly run under stoichiometric conditions (A/F-ratio=14.56 or $\lambda=1$), there is still a need to further improve the ability to mitigate noxious pollutants.

As said, optimal conversion of HC, CO and NOx over a TWC is achieved at $\lambda=1$. However, gasoline engines are rather operated under oscillating conditions between slightly lean and slightly rich conditions ($\lambda=1\pm0.05$=>wobbling). Under purely rich conditions, the conversion of hydrocarbons drops rapidly. Under lean conditions NOx is converted less efficiently. In order to broaden the optimal operation range of a TWC, an oxygen storage material, is included in the formulation of the TWC.

The oxygen storage materials referred to above are typically based upon mixed oxides of $CeO_2/ZrO_2$ (WO2008113445A1; U.S. Pat. No. 7,943,104BB) and are solid electrolytes known for their oxygen ion conductivity characteristic. In these oxygen storage materials the $CeO_2$ is employed to buffer the catalyst from local variations in the air/fuel ratio during typical catalyst operation. They achieve this by 'releasing' active oxygen from their 3-D structure in a rapid and reproducible manner under oxygen-depleted transients, 'regenerating' this lost oxygen by adsorption from the gaseous phase under oxygen-rich conditions. This activity is attributed to the reducibility and oxidability (reduction-oxidation or redox activity) of $CeO_2$ via the $2Ce^{4+} \leftrightarrow 2Ce^{3+}$ [$O_2$] reaction. The high availability of oxygen is critical for the promotion of generic oxidation/reduction chemistries e.g. CO/NO chemistry for the gasoline three-way catalyst, or more recently also for the direct catalytic oxidation of particulate matter (soot) in the EDPF, see e.g. US20050282698 A1, SAE 2008-01-0481.

Hence, there have been extensive studies on the chemistry, synthesis, modification and optimization of regularly used Ce—Zr based oxygen storage materials. For example, the use of Ceria-Zirconia doped with lower valent ions for emission control applications has been extensively studied in e.g. U.S. Pat. No. 6,468,941B1, U.S. Pat. No. 6,585,944B1 and US20050282698A1. These studies demonstrate that lower valent dopant ions such as rare earth metals e.g. Y, La, Nd, Pr, etc., transition metals e.g. Fe, Co, Cu etc. or alkaline earth metals e.g. Sr, Ca and Mg can all have a beneficial impact upon oxygen mobility in the respective mixed-oxide matrix. This is proposed to arise from the formation of oxygen vacancies within the cubic lattice of the solid solution which lowers the energy barrier to oxygen ion transport from the crystal bulk to the surface thereby enhancing the ability of the solid solution to buffer the air fuel transients occurring in the exhaust stream of a typical gasoline (three-way) catalyst application.

Finally U.S. Pat. No. 6,468,941B1 and U.S. Pat. No. 6,585,944B1 teach the potential for employing base i.e. non-precious group (Pt, Pd, Rh, Au etc.) dopant metals into the cubic fluorite lattice of the solid solution as an alternative means to promote the redox chemistry of Ce, with Fe, Ni, Co, Cu, Ag, Mn, Bi and mixtures of these elements being identified as of particular interest. Hence, while normal non-promoted OSM typically exhibit a redox maximum, as determined by $H_2$ Temperature Programmed Reduction ($H_2$-TPR), at ca. 600° C., the inclusion of base metals within the lattice can decrease this temperature by >200° C. at a fraction of the cost incurred by the use of precious metals.

U.S. Pat. No. 6,585,944B1 discloses an OSM comprising besides zirconium, cerium, and a rare earth metal as a stabilizer, 0.01 to 0.25 mol-% of at least one kind of metal selected from a group consisting of iron, copper, cobalt, nickel, silver, manganese, and bismuth. And, the literature describes that these metals exist as a solid solution in a crystal structure of the OSM.

In addition, JP2005125317A discloses an oxygen storage material comprising a carrier containing ceria ($CeO_2$) and iron oxide as an active species contained in said carrier. The literature describes that the carrier containing $CeO_2$ is preferably a solid solution of $CeO_2$—$ZrO_2$. Further, it is mentioned that the content of iron oxide is desirably in a range of 2 to 30% by weight as $Fe_2O_3$ relative to the weight of the OSM, and substantial OSM cannot be obtained when the content deviates from this range.

It is already known that certain mixed oxides, which do not contain $CeO_2$, can uptake and release oxygen, whilst being used as catalytic active materials. E.g. V—Nb-mixed oxide systems have been described to be useful in the oxidation of propane (Catal. Today 118 (2006) 323; J. Solid State. Chem. 182 (2009) 2053; Mater. Res. Bull. 46 (2011) 1955).

There have been attempts to produce ceria free oxygen storage components (WO10096612A2). For example, WO2011109676A2 refers to ceria-free oxygen storage components, like e.g. zirconia-praseodymia, zirconia-neodymia, zirconia-yttria and zirconia-lanthana. Nevertheless, still a need exists for more or alternative and even better oxygen storage materials not only because the rare earth crisis told that reliance on $CeO_2$ only may lead to shortcomings in supply of TWC and other catalysts needed in the market.

Hence, it is an objective of the present invention to propose the usage of certain components that are able to substitute the $CeO_2$—$ZrO_2$ mixed oxides in oxygen storage materials. It is further an object to present application to propose said components for, e.g. in TWC application, said components acting at least as efficient in oxygen storage behavior, preferably even better as usual Ce-based oxides in a respective catalyst. Naturally, these objectives should be accomplished by less expensive materials.

These objectives as well as others being easily derived from the prior art by the artisan are achieved by using an oxygen storage component according to the present invention. Preferred aspects of the present invention are discussed herein.

Factually, the present invention suggests the use of a binary, ternary or higher mixed oxide of the formula

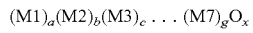

$$(M1)_a(M2)_b(M3)_c \ldots (M7)_g O_x$$

wherein $0 \leq a, b, c, \ldots, g \leq 20$ with at least a and b>0; and x adapts a value to compensate the positive charge originating from the metal cations M1-M7 being selected from the group consisting of Fe, Mn, V, Nb, Ta, Mo, W, as oxygen storage component (OSC) in exhaust catalysis.

These materials are active oxygen storage components being able to store oxygen not much less efficiently than conventional Ce-based oxygen storage components but for the advantage of a higher relative and absolute oxygen storage capacity. The components of the invention are able to substitute the Ce-based oxygen storage components in normal TWC or other catalyst types without further measures to be taken. Hence, it is possible to omit the heavy and costly Ce-based oxygen storage components completely and produce catalysts with Ce-free oxygen storage materials.

For an advantageous use the catalytic oxygen storage component of the invention further comprises a catalytically active precious metal selected from the group consisting of Cu, Ag, Au, Pt, Pd, Rh, Ru, Ir and mixtures thereof, and further a support material, like a high surface area refractory metal oxide support having a surface area of at least 50 m$^2$/g. Altogether this is called to be an oxygen storage material (OSM).

The catalytically active precious metals serve for the activation of a fast oxygen storage and release. Whereas the precious metal free binary, ternary or higher mixed oxide components of the invention in $H_2$-TPR only show a reducibility at elevated temperatures, the catalytically active precious metals activate the oxygen atoms of said mixed oxide so that respectively doped samples release oxygen at temperatures well below 200° C. already.

Useful oxygen storage materials contain at least one of the active precious metals, like Cu, Ag, Au, Pt, Pd, Rh, Ru, Ir with platinum, palladium and/or rhodium being preferred. Said catalytic metals are typically used in amounts of about >0 to about 14 g/l (400 g/ft$^3$), preferably from 0.1-8.8 g/l (3 to 250 g/ft$^3$), most preferred between 0.35-7 g/l (10-200 g/ft$^3$), depending on the respective metal applied. Amounts of these metals are based on weight divided by carrier volume, and are typically expressed in grams of material per liter carrier volume. With regard to Pd an amount of from 0.0-300 g/l, preferably 0.1-100 g/l and most preferred 0.5-14 g/l are applied. Pt may be present in an amount of from 0.1-50 g/l, preferably, 0.5-20 g/l and most preferred 1.0-7 g/l. Rh can be comprised from 0.0-1.0 g/l, preferably 0.01-0.7 g/l and most preferred 0.1-0.5 g/l.

As will be apparent to those of ordinary skill in the art, the active precious metals, acting as catalytic agents, can exist in the oxygen storage materials in multiple oxidation states while in use. By way of example, palladium can exist as palladium metal (0), Pd (II), and Pd (IV) in the catalyst. In a preferred method of preparing the oxygen storage material, a suitable precious metal compound and/or complex of the active precious metal can be utilized to achieve dispersion of the metal on the oxygen storage component described in this invention and/or on a support, e.g. activated alumina support particles (see below). As used herein, the term "precious metal compound" means any precious metal compound, complex, or the like which, upon calcination or use of the catalyst decomposes or otherwise converts to a catalytically active precious metal, usually, the precious metal itself or the precious metal oxide. Hence, compounds or complexes of said precious metals soluble or dispersible in a liquid, preferably water, can be utilized as long as the liquid used to impregnate or deposit the catalytic metal compounds onto the oxygen storage component and/or onto the support particles does not adversely react with the catalytic precious metal or its compound or complex or the other components of the oxygen storage material and is capable of being removed from the catalyst by volatilization or decomposition upon heating and/or the application of vacuum.

In some cases, the completion of removal of the liquid may not take place until the catalyst is placed into use and subjected to the high temperatures encountered during operation. Generally, both from the point of view of economics and environmental aspects, aqueous solutions of soluble compounds of the active precious metals are preferred. For example, suitable compounds are chloroplatinic acid, amine solubilized platinum hydroxide, platinum nitrate, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the active precious metal or a compound thereof.

The oxygen storage components used according to the invention and the catalytically active precious metals are usually provided in the exhaust catalyst on a high surface area support material. Useful catalytic supports for the active precious metal and/or the binary, ternary or higher oxides of this invention include any of the refractory metal oxides usually taken for this exercise, such as one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. Preferably, the support is substantially comprised of alumina which preferably includes the members of the gamma or activated alumina family, such as gamma, alpha, delta, eta and/or theta aluminas, and, if present, a minor amount of other refractory oxides, e.g., about up to 20, preferably up to 10 weight percent of support material. Preferably, the support comprises γ-alumina. The support material is providing a BET specific surface area of about 50 to about 400, preferably 80 to 350 and most preferred 100 to 300 m$^2$/g.

The use of mixed oxide components according to the invention is directed to certain binary, ternary or higher mixed oxides which are capable of storing oxygen. It has turned out that said materials are in particular useful for oxidation and reduction depending on the partial pressure of oxygen in the ambient exhaust, especially in automotive applications. Comparable to the oxygen storage mechanism as observed in $CeO_2$ based materials (Wilhelm Keim, in Handbook of Heterogeneous Catalysis, $2^{nd}$ Edition Chapt 11, Vol 5, page 2295), the activity of the binary or ternary or higher mixed oxides described in this document is attributed to the reducibility of at least one of the elements used in the mixed oxides with simultaneous oxygen release under oxygen depleted conditions and the reversibility of this reaction when the environment is oxygen rich (see also Holleman Wiberg, 101. Edition; Bergner et al. J. Solid State Chem. 182 (2009) 2053; Börrnert et al. Materials Research Bulletin 46 (2011) 1955). The advantage of the elements used herein is their wealth on oxidation states and hence a large possibility to show redox properties. In the case of Vanadium containing mixed oxides for example, a stepwise reduction of V(V) to V(II) under release of $O_2$ might be considered.

In general, the oxygen release reaction can be described as follows:

$$(M1)_a(M2)_b(M3)_c \ldots (M7)_g O_x \leftrightarrow (M1)_a(M2)_b (M3)_c \ldots (M7)_g O_{x-1} + \tfrac{1}{2} O_2.$$

In a preferred aspect of the present invention an oxygen storage component is proposed for exhaust catalysis in which the values for a are in the molar range of >0-20, preferably 1-20 and most preferred between 1-16. Likewise the values for b are in the range of from >0-20, preferably 1-20 and most preferred from 1-17. In addition the values for c may be in the range of 0-5, preferably 0-2 and most preferred from 0-1 and d-g may be in the range of 0-5, preferably 0-2 and most preferred from 0-1. A very preferred oxygen storage component shows values of a-g, wherein a is from 1-16, b is from 1-17, c is from 0-1 and d, e, f, g is from 0-1. An extremely preferred oxygen storage component is one having a=1 and b=1, in which M1 and M2 are selected from the group of Fe, V, Mn, and c-g are 0.

An oxygen storage component used in the present invention can store oxygen to a certain extent under conditions prevailing in the exhaust, e.g. of an internal combustion engine. The component is able to store the oxygen from the ambient exhaust gas to an extent of preferably at least 8.000 µg $O_2$/mmol oxygen storage component (i.e. the absolute oxygen storage capacity is at least 8.000 µg $O_2$/mmol oxygen storage component). In a more preferred aspect the present invention provides for oxygen storage components which are able to store the oxygen at level of at least 10.000, most preferred over 12.000 µg $O_2$/mmol oxygen storage component.

The relative oxygen storage capacity of the oxygen storage components being part of this invention preferably should be at least 33%, more preferred more than 50% and in a most preferred way over 75%.

Further, an oxygen storage component comprising material (OSM) as depicted in the present invention should in $H_2$-TPR experiments be able to be oxidized and reduced within a temperature range of from 20°-650° C., preferably 20°-350° C. and most preferred 20°-200° C. It is to be noted that a good oxygen storage material is a material having a peak temperature of reduction within below 300° C., more preferred below 150° C. and most preferred below 100° C. It should also be stressed that the material has a high resistance against aging. Under hydrothermal redox aging [6 h; 1000° C.; 1 min; 1% CO; 1 min 1% $O_2$; 10% $H_2O$; balance $N_2$] the material loses less than 67%, preferably less than 50% and most preferably less than 33% of the oxygen storage capacity (both relative as well as absolute). The OSM is likewise used in exhaust catalyst as mentioned herein above for the component.

The oxygen storage capacity of instant components as used according to the present invention is established through a mixed oxide of above mentioned composition.

The transition metals can be selected according to the knowledge of the skilled worker among the group of metals presented by the group consisting of Fe, Mn, V, Nb, Ta, Mo and W. In a preferred embodiment only 5 metals (M1-M5) are taken to build up the oxygen storage component and are selected from the group consisting of Fe, Mn, V, Nb and W. In a very preferred aspect an oxygen storage component according to the invention is proposed, wherein M1-M2 are selected from the group consisting of Fe, Mn, V. It should well be understood that the oxygen storage component, i.e. the component establishing the oxygen storage capacity, is free of any ceria or mixed oxides containing ceria. In a most preferred embodiment, however, the oxygen storage material, i.e. the oxygen storage component plus the catalytically active precious group metals plus the support material, does not comprise any ceria or mixed oxides containing ceria.

The preparation of the oxygen storage components and of the oxygen storage materials based on the oxygen storage components described in this invention is as known by the skilled worker. Preferably, the oxygen storage component is prepared by the formation of an aqueous solution containing all precursors of the oxygen storage component. E.g., any kind of water soluble precursor of the metals (M1-M7) might be used in this respect. Most preferred are iron acetate, iron nitrate, manganese acetate, manganese nitrate, vanadyloxalate, ammoniummetavanadate, ammoniumniobiumoxalate, tantalumoxalate, ammoniummolybdate and/or ammoniummetawolframate. Alternatively the oxides, the oxohydroxides and/or the hydroxides of the metals (M1-M7) might be used as precursor for the preparation of the oxygen storage components.

If present in dissolved form the oxygen storage component might be formed by precipitation out of the solution containing the mixture of the precursors of the oxygen storage components, or by evaporation of the solvent. Alternatively, the preferably aqueous solution containing the precursors of the oxygen storage component might be added to the supporting oxide by pore volume impregnation, i.e. incipient wetness impregnation (see: J. W. Geus in *Preparation of Solid Catalysts* Wiley VCH (1999), Chapt. 4, Page 464) or by adding the solution containing the precursors of the oxygen storage components or adding the dispersion containing the oxygen storage component on a slurry containing the supporting oxide. The final oxygen storage component is obtained as an oxide by thermal treatment of the materials obtained by the preparation methods above.

To obtain oxygen storage materials the precious metal precursor might be added to the solution containing the oxygen storage component precursors or to the dispersion containing the oxygen storage component. Alternatively, the precious metal precursor is added in a next preparation step to the already formed oxygen storage component obtained by the methods described above. Again, the addition of the precious metal precursor is as known by the skilled worker. Preferably, an aqueous solution of the precious metal precursor is added to the oxygen storage component or to the mixture of the oxygen storage component and the supporting oxide by pore volume impregnation or by adding the precious metal containing solution on a slurry containing the oxygen storage component or on the mixture of the oxygen storage component and the supporting oxide.

In a very preferred way of preparation, an aqueous solution containing the precursors of the oxygen storage component is added to the supporting oxide by pore volume impregnation, followed by drying and calcination of the mixture. In a second step, the precious metal precursor is added by pore volume impregnation on said calcined mixture of the oxygen storage component and the supporting oxide. The precious metal precursor is converted to the active precious metal as described above.

The present invention deals with alternative $CeO_2$-free components and materials having oxygen storage capacity and their use in exhaust, in particular automotive exhaust catalysis. The materials are characterized by a high specific surface area, a low temperature activation of reduction, a high relative oxygen storage capacity as well as a high absolute oxygen storage capacity compared to $CeO_2$ containing reference material.

To determine the activity of the oxygen storage components and materials based on the oxygen storage components $H_2$-TPR experiments are carried out. Therefore, a powder sample of the oxygen storage material is heated under a $H_2$ flow and the uptake of $H_2$ as a function of the temperature is monitored.

The temperature with the maximum $H_2$ uptake (i.e. the peak temperature) is a measure for the oxygen release speed. As described above, the materials being part of this invention are characterized by a low peak temperature.

The relative oxygen storage capacity of the oxygen storage component is defined as the amount $H_2$ actually consumed by the oxygen storage component relative to the maximum amount $H_2$ needed for a full reduction of the oxygen storage component and is given in %. This relative oxygen storage capacity is a measure for the degree of reducibility of the oxygen storage component.

As the oxygen storage components described in this invention might show quite different values for their molecular weight, a comparison of the $H_2$ uptake relative to the molar amount of oxygen storage component makes sense. This value is defined as the absolute hydrogen uptake capacity and is given in µg $H_2$/mmol component. Since the $H_2$ uptake is a measure for the amount of $O_2$ released by the component because of the following chemical reaction $$(M1)_a(M2)_b(M3)_c \ldots (M7)_g O_x + H_2 \rightarrow (M1)_a(M2)_b(M3)_c \ldots (M7)_g O_{x-1} + H_2O$$

the absolute oxygen storage capacity in µg $O_2$/mmol component can be calculated from the absolute hydrogen uptake per mmol component.

In FIG. 1 the $H_2$-TPR measurements for two oxygen storage materials based on the oxygen storage components described in this invention are given. For the comparative example a 1 w % Pd/10 w % $CeO_2$ on $Al_2O_3$ similarly prepared like the materials of this invention is given. The advantage of claimed components can clearly be seen.

Due to the presence of the precious metal, a low temperature activation of the reducibility of all materials is observed, which is shown in a low peak temperature in the $H_2$-TPR measurements. Nevertheless, the materials described in this invention typically show a peak temperature lower as observed for the comparative example which is a $CeO_2$ containing material. In the case of the $FeVO_4$ system, the peak temperature is observed at 95° C., which is 12° C. lower as the comparative example containing $CeO_2$.

The relative oxygen storage capacity of the oxygen storage component is much higher for the oxygen storage component disclosed in this invention as for the $CeO_2$ containing comparative sample. In the case of the $VNbO_5$ system a relative oxygen storage capacity of 81% is observed for the temperature range from room temperature up to 700° C., whereas the $CeO_2$ containing comparative example shows a relative oxygen storage capacity of only 31% for the same temperature range. In addition, other materials that are part of this invention show a higher relative oxygen storage capacity compared to the comparative example (e.g. the $FeVO_4$ system shows a relative oxygen storage capacity of 68%)

Similar results are observed for the absolute hydrogen uptake capacity. The oxygen storage components being part of this invention show a much higher absolute hydrogen uptake capacity in µg $H_2$/mmol component as the comparative $CeO_2$ sample. Whereas the absolute hydrogen uptake capacity in µg $H_2$/mmol for the $FeVO_4$ system is 2048 µg $H_2$/mmol oxygen storage component for the temperature range from room temperature up to 700° C., the $CeO_2$ sample shows in the same temperature range a $H_2$ uptake of only 306 µg $H_2$/mmol $CeO_2$.

As the absolute oxygen storage capacity is calculated from the absolute hydrogen uptake capacity, it is clear that the oxygen storage components disclosed in this invention show a significantly higher absolute oxygen storage capacity compared to the reference sample. The $FeVO_4$ sample shows an absolute oxygen storage capacity of 16384 µg $O_2$/mmol component, which is significantly higher as the comparative example (i.e. 2448 µg $O_2$/mmol component for the $CeO_2$ containing comparative example).

According to the above said the components and materials presented herein are fairly deemed to substitute ceria and mixed oxides containing ceria in so called oxygen storage components and respective materials. It has hitherto not been made available to the public that said components and materials may exhibit such superior oxygen storage capabilities. Hence, it is correct to say that it is rather a surprise that instant components and materials may serve as advantageous compartments of catalysts, in particular exhaust catalysts, especially in the automotive area.

EXAMPLES

Example 1: 1 w % Pd/10 w % $CeO_2$ on $Al_2O_3$
(Comparative Sample)

The catalyst material was prepared by pore volume impregnation of a $Al_2O_3$ powder with a mixture of an aqueous solution of $Pd(NO_3)_2$ and $(NH_4)_2Ce(NO_3)_6$. After drying, the sample was calcined in static air for 4 h at 700° C.

Example 2: 1 w % Pd/10 w % $VNbO_5$ on $Al_2O_3$

The catalyst material was prepared by pore volume impregnation of a $Al_2O_3$ powder with a mixture of an aqueous solution of $Pd(NO_3)_2$, Vanadyloxalate and Ammonium Niobium oxalate. After drying, the sample was calcined in static air for 4 h at 700° C.

Example 3: 1 w % Pd/10 w % $FeVO_4$ Supported on $Al_2O_3$

The catalyst material was prepared by pore volume impregnation of a $Al_2O_3$ powder with a mixture of an aqueous solution of $Pd(NO_3)_2$, Vanadyloxalate and Iron nitrate. After drying, the sample was calcined in static air for 4 h at 700° C.

Referring to FIG. 1 and Table 1 the redox activity characteristics are compared for the samples 1 w % Pd/10 w % $CeO_2$ on $Al_2O_3$ (comparative example), 1 w % Pd/10 w % $VNbO_5$ on $Al_2O_3$ and 1 w % Pd/10 w % $FeVO_4$ supported on $Al_2O_3$. It is seen that the oxygen storage materials based on the oxygen storage components described in this patent show enhanced properties compared to the $CeO_2$ containing comparative example. This is further demonstrated in Table 1, where the maxima in reduction temperatures are recorded as well as the relative oxygen storage capacity (in %), the absolute hydrogen uptake capacity (in µg $H_2$/mmol oxygen storage component), and the absolute oxygen storage capacity (in µg $O_2$/mmol oxygen storage component) of the oxygen storage components.

TABLE 2

Compilation of the data obtained from H2 TPR

| Material | H$_2$ TPR Peak position, °C. | relative oxygen storage capacity (%); RT-700° C. | absolute hydrogen uptake capacity (μg H$_2$/mmol oxygen storage component); RT-700° C. | absolute oxygen storage capacity (μg O$_2$/mmol oxygen storage component); RT-700° C. | Redox reaction |
|---|---|---|---|---|---|
| Example1 (comparative example) | 107 | 31 | 306 | 2448 | CeO$_2$ → Ce$_2$O$_3$ <br> +IV → +III |
| Example2 | 109 | 81 | 1617 | 12936 | VNbO$_5$ → VNbO$_3$ <br> +V/+V → +III/+III |
| Example3 | 95 | 68 | 2048 | 16384 | FeVO$_4$ → Fe$_2$V$_2$O$_5$ <br> +III/+V → +II/+III |

The invention claimed is:

1. An automotive exhaust catalyst comprising an oxygen storage component, said oxygen storage component comprising:
    a binary, ternary or higher mixed oxide consisting of the formula (M1)$_a$(M2)$_b$(M3)$_c$(M4)$_d$(M5)$_e$(M6)$_f$(M7)$_g$O$_x$ wherein
    0≤a, b, c, d, e, f, g≤20 with at least a and b>0;
    and x adapts a value to compensate the positive charge originating from the metal cations M1-M7 being selected from the group consisting of Fe, Mn, V, Nb, Ta, Mo, and W.

2. The automotive exhaust catalyst of claim 1, further comprising catalytically active precious metals selected from the group consisting of Cu, Ag, Au, Pt, Pd, Rh, Ru, Ir and mixtures thereof.

3. The automotive exhaust catalyst of claim 2, wherein the mixed oxide is supported on a high surface area refractory metal oxide support having a surface area of at least 50 m$^2$/g.

4. The automotive exhaust catalyst of claim 1, wherein the mixed oxide is supported on a high surface area refractory metal oxide support having a surface area of at least 50 m$^2$/g.

5. The automotive exhaust catalyst of claim 1, wherein a is from >0-20, b is from >0-20, c is from 0-5 and d, e, f, g is from 0-5.

6. The automotive exhaust catalyst of claim 1, wherein only M1-M5 are present and selected from the group consisting of Fe, Mn, V, Nb and W.

7. The automotive exhaust catalyst of claim 1, wherein the oxygen storage component has an absolute oxygen storage capacity of at least 8000 μg O$_2$/mmol oxygen storage component.

8. The automotive exhaust catalyst of claim 1, which is free of ceria.

9. A method for storing oxygen in exhaust catalysis, comprising:
    introducing onto a support a binary, ternary or higher mixed oxide consisting of the formula (M1)$_a$(M2)$_b$(M3)$_c$(M4)$_d$(M5)$_e$(M6)$_f$(M7)$_g$O$_x$ wherein
    0≤a, b, c, d, e, f, g≤20 with at least a and b>0;
    and x adapts a value to compensate the positive charge originating from the metal cations M1-M7 being selected from the group consisting of Fe, Mn, V, Nb, Ta, Mo, and W as an oxygen storage component, and
    supplying exhaust gas to the binary, ternary or higher mixed oxide.

10. The method of claim 9, further comprising introducing onto the support catalytically active precious metals selected from the group consisting of Cu, Ag, Au, Pt, Pd, Rh, Ru, Ir and mixtures thereof.

11. The method of claim 9, wherein the mixed oxide is supported on a high surface area refractory metal oxide support having a surface area of at least 50 m$^2$/g.

12. The method of claim 9, wherein a is from >0-20, b is from >0-20, c is from 0-5 and d, e, f, g is from 0-5.

13. The method of claim 9, wherein only M1-M5 are present and selected from the group consisting of Fe, Mn, V, Nb and W.

14. The method of claim 9, wherein the oxygen storage component has an absolute oxygen storage capacity of at least 8000 μg O$_2$/mmol oxygen storage component.

* * * * *